United States Patent [19]

Blattmann

[11] Patent Number: 4,583,427
[45] Date of Patent: Apr. 22, 1986

[54] GEAR BOX

[75] Inventor: Lee D. Blattmann, Paddington, Australia

[73] Assignee: Tamille Pty. Limited, Guildford, Australia

[21] Appl. No.: 715,184

[22] Filed: Mar. 22, 1985

[30] Foreign Application Priority Data

Mar. 23, 1984 [AU] Australia .................... PG4219

[51] Int. Cl.[4] .................................... F16H 3/44
[52] U.S. Cl. .................... 74/760; 74/750 B; 74/781 B
[58] Field of Search .............. 74/750 B, 781 B, 760, 74/340; 280/236, 238

[56] References Cited

U.S. PATENT DOCUMENTS

| | | | |
|---|---|---|---|
| 2,754,696 | 7/1956 | Douglas et al. | 74/781 B |
| 2,844,050 | 7/1958 | Brendel | 74/781 B X |
| 2,982,384 | 5/1961 | Hood | 74/781 B X |
| 3,726,156 | 4/1973 | Tijem et al. | 74/750 B |
| 3,908,807 | 9/1975 | Ozaki et al. | 74/750 B X |
| 4,323,146 | 4/1982 | Fukui | 74/750 B X |

FOREIGN PATENT DOCUMENTS 245530 5/1963 Australia ............... 74/750 B

Primary Examiner—Lawrence J. Staab
Assistant Examiner—Martin G. Belisario
Attorney, Agent, or Firm—Ladas & Parry

[57] ABSTRACT

A planetary gear arrangement including a driven shaft, a planetary gear change connecting the driven shaft with a hub and wherein the planetary gear train has two ratios selected by means of longitudinal movement of the planetary gear train longitudinally of the shaft in order to hold either a sun gear or a ring gear stationary with respect to the planetary gears.

7 Claims, 3 Drawing Figures

GEAR BOX

The present invention relates to gear boxes and more particularly but not exclusively to gear boxes for pedal driven vehicles.

In bicycles, and more particularly but not exclusively front wheel driven bicycles, gear change mechanisms are generally complex since they require cable devices to effect gear changes. This not only increases the complexity of the item, making it prone to failure, but also increases the cost thereof.

It is the object of the present invention to overcome or substantially ameliorate the above disadvantages.

There is disclosed herein a planetary gear arrangement comprising a driven shaft, a carrier fixed to the shaft so as to rotate therewith, said carrier being movable longitudinally of the shaft, a plurality of planetary gears, rotatably mounted on the carrier so as to be rotatable about axes generally parallel to the shaft but spaced therefrom, a sun gear meshingly engaged with said planetary gears at positions radially inwardly of the axes of said planetary gears relative to said shaft, a ring gear meshingly engaged with said planetary gears at a position radially outward of the axes of said planetary gears relative to said shaft, clutch means to selectively permit rotation of said sun gear while said ring gear is held stationary, or to permit rotation of said ring gear while said sun gear is held stationary.

A preferred form of the present invention will now be described by way of example with reference to the accompanying drawing wherein.

Figure 1:
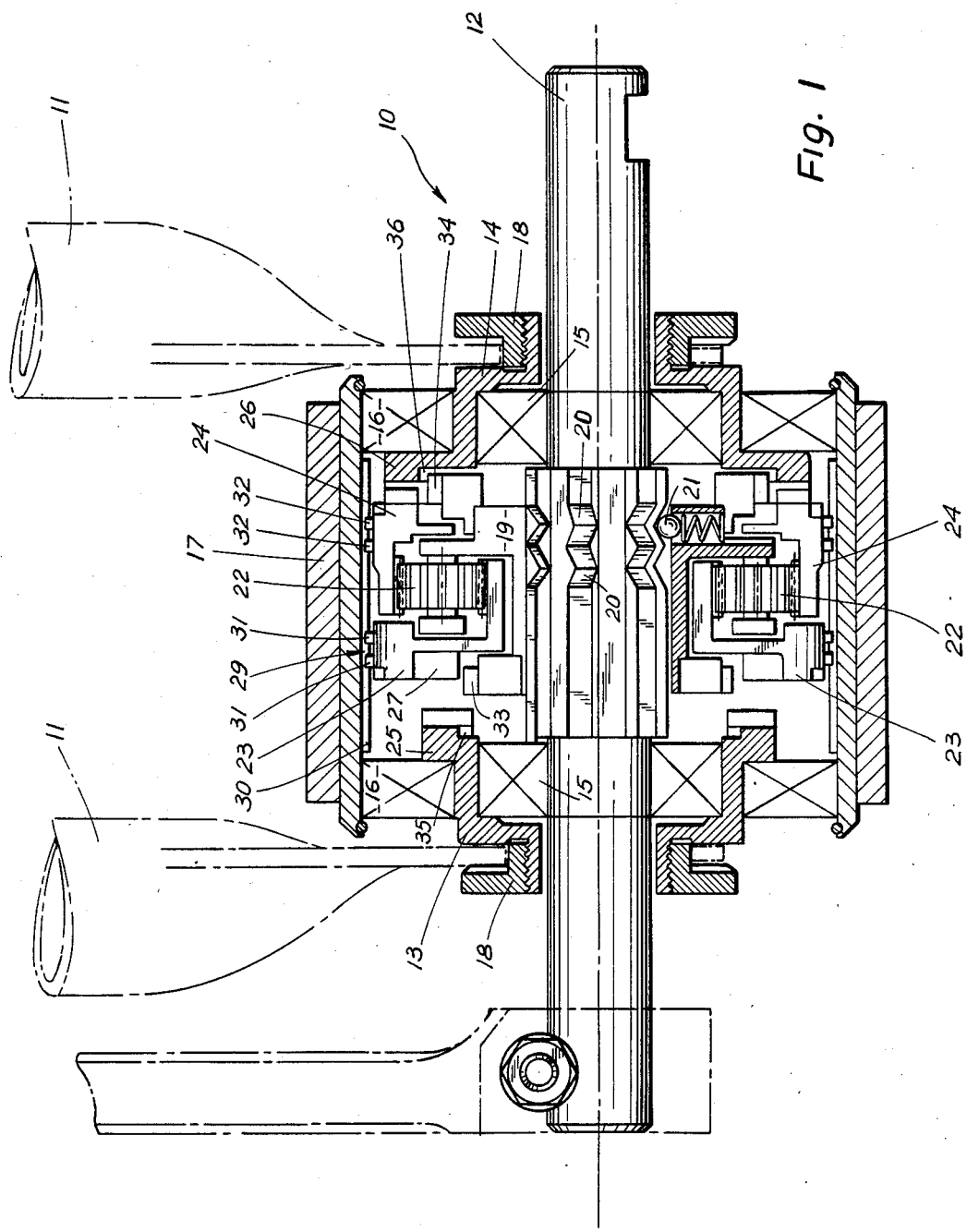
FIG. 1 is a schematic sectioned side elevation of a planetary gear arrangement.
Figure 2:
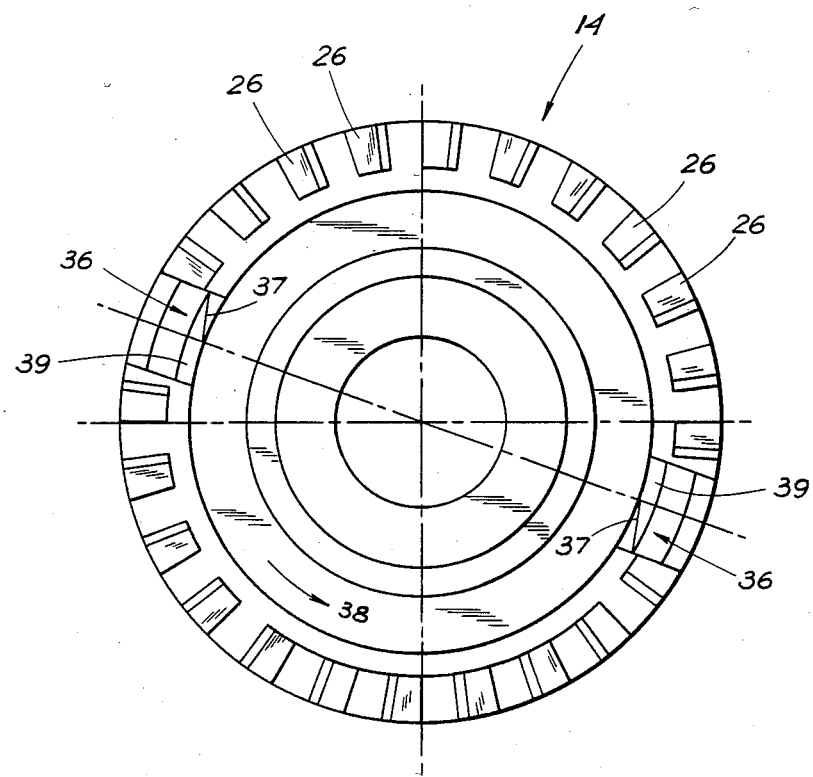
FIG. 2 is a schematic front elevation of a cam member employed in the gear arrangement of FIG. 1.

In FIGS. 1 and 2 of the accompanying drawings there is schematically depicted a planetary gear assembly 10 coupled to the front forks 11 of a front wheel pedal driven bicycle. However, it should be appreciated that the planetary gear assembly 10 may be used in a conventional rear wheel driven bicycle or in any situation where a two speed planetary gear assembly may be used. As a further example the planetary gear assembly 10 may be used in a winch where one or more winch ratio is required.

The planetary gear assembly 10 is coupled to a pedal driven shaft 12. The gear assembly 10 includes two bearing supports 13 and 14 which support a first pair of bearings 15 which secure the shaft 12 in position and allow rotation thereof upon a torque being applied thereto via the pedals of the bicycle. The supports 13 and 14 also support a pair of outer bearings 16 which rotatably support the central hub 17 of the wheel of the bicycle. The supports 13 and 14 are fixed to the front forks 11 means of nuts 18.

The planetary gear assembly 10 includes a carrier 19 fixed to the shaft 12 by means of splines so as to rotate therewith. However, the carrier 19 is longitudinally movable of the shaft 12 to alter the reduction ratio of the planetary gear assembly 10. The two operating positions of the carrier 19 are defined by notches 20 with the carrier being provided with a spring loaded ball 21 to define the two operating positions. Mounted on the carrier 19 so as to be rotatable about axes spaced from the axis of the shaft 12, is a series of planetary gears 22. The planetary gears 22 meshingly engage a sun gear 23 and a ring gear 24. The sun gear 23 and ring gear 24 as rotatably supported by the carrier 19. The carrier 19, planetary gears 22, sun gear 23 and ring gear 24 are movable longitudinally of the shaft 12 as a complete assembly. Integrally formed with the supports 13 and 14 are two sets of dogs 25 and 26 which selectively meshingly engage respectively with the dogs 27 and 28 formed integral with the sun gear 23 or the ring gear 24. Accordingly by selective engagement of the dogs 25 and 27 or 26 and 28, either the sun gear 23 or ring gear 24 can be held stationary and the other allowed to rotate. This selective meshing engagement of the dogs 25 and 27 or 26 and 28 is achieved by the longitudinal movement of the carrier 19 longitudinal of the shaft 12. When the dogs 26 and 28 are engaged, rotation of the carrier 19 will cause rotation of the planetary gear 22 by meshing engagement with the ring gear 24. This rotation of the planetary gears 22 is then transferred to the sun gear 23 wherefrom this rotational movement is transferred to the hub 17 by means of a ratchet and pawl assembly 29. The ratchet and pawl assembly 29 includes a plurality of ribs 30 and pawls 31. When the carrier 19 is moved from the position depicted to a position whereby the dogs 25 and 27 are engaged, the sun gear 23 is prevented from movement. Accordingly, the planetary gears 22 will then be caused to rotate thereby causing rotation of the ring gear 24. This rotation of the ring gear 24 is transferred to the hub 17 by means of a ratchet and pawl assembly including the ribs 30 and pawls 32.

The shaft 12 is pedal driven in a particular driving direction. Alteration of the ratio of the planetary gear assembly 10 is achieved by rotation of the shaft 12 in the opposite direction to the driving direction. Mounted on the carrier 19 are two sets of ratchet members 33 and 34 which are positioned so as to selectively engage one or more stops 35 or 36 fixed to the supports 13 and 14. The ratchet members 33 and 34 allow rotation of the shaft 12 in a driving direction. Upon rotation of the shaft 12 in a non-driving direction, one of the sets of ratchet member 33 or 34 will engage its respective stop 35 or 36. When the shaft 12 is rotating in a driving direction the ratchet members 33 and 34 ride over the stops 35 and 36 to thereby allow free rotation of the shaft 12. Upon one of the ratchet member 33 or 34 engaging its respective stop 35 or 36, the assembly including the carriage 19 is caused to move along the shaft 12 since the ratchet members 33 and 34 and/or stops 35 and 36 have tapered surfaces which cause movement of the carriage 19. For example, in the position depicted, the ratchet member 34 is engaged with the stop 36. Upon, the shaft 12 being rotated in a non-driving direction, the tapered surfaces on the ratchet member 34 and/or 36 will cause leftward movement of the carriage 19. As the carriage 19 moves leftward, the dogs 25 and 26 will engage thereby allowing driving motion again to be applied to the shaft 12. The dogs 25 and 27, and 26 and 28, have raked teeth so as to enhance engagement. Via this engagement, the carriage 19 is further moved leftward until the ratchet member 33 is radially aligned with the stops 35. Additionally, this further leftward movement required by the carriage 19 is effected by the spring loading of the ball 21 into the leftward notch 20.

Now particular reference to FIG. 2 wherein the support member 14 is depicted. In this particular embodiment, the support member 14 is provided with the angularly spaced dogs 26 as well as the two stops 36. The stops 36 are each provided with cam means in the form of a ramp surface 37 which engages the ratchet member 34 and causes deflection thereof to allow movement of the ratchet members 34 in the direction of the arrow 38. The direction of the arrow 38 is the direction of driving rotation of the shaft 12. The ramp surfaces 37 are generally planar and define a plane perpendicular to the plane to the drawing of FIG. 2. Additionally the stops 36 and 37 are provided with a second pair of ramp surfaces 39, also forming part of the cam means, which define planes defining an acute angle relative to the plane of the drawing of FIG. 2. Upon the shaft 12 being rotated in the non-driving direction, in order to change the ratios, the ratchet members 34 move in the opposite direction to the arrow 38. The ratchet members 34 will then engage the ramps services 39 to cause movement of the carriage 19 longitudinally of the shaft 12. Accordingly it should be appreciated that the ratchet members 34 are deflectable by the ramp surfaces 37 so as to be moved radially relative to the shaft 12. However the ratchet members 34 are not deflectable in a direction parallel to the axis of the shaft 12 without causing movement of the carriage 19. Accordingly upon the ratchet members 34 engaging the ramp surfaces 39, the carriage 19 is caused to move longitudinally of the shaft 12. It should further be appreciated that the support 13 is of a similar configuration as is support 14 and the ratchet members 33 inter-react therewith in the same manner as the ratchet members 34 inter-react with the support 14.

Figure 3:
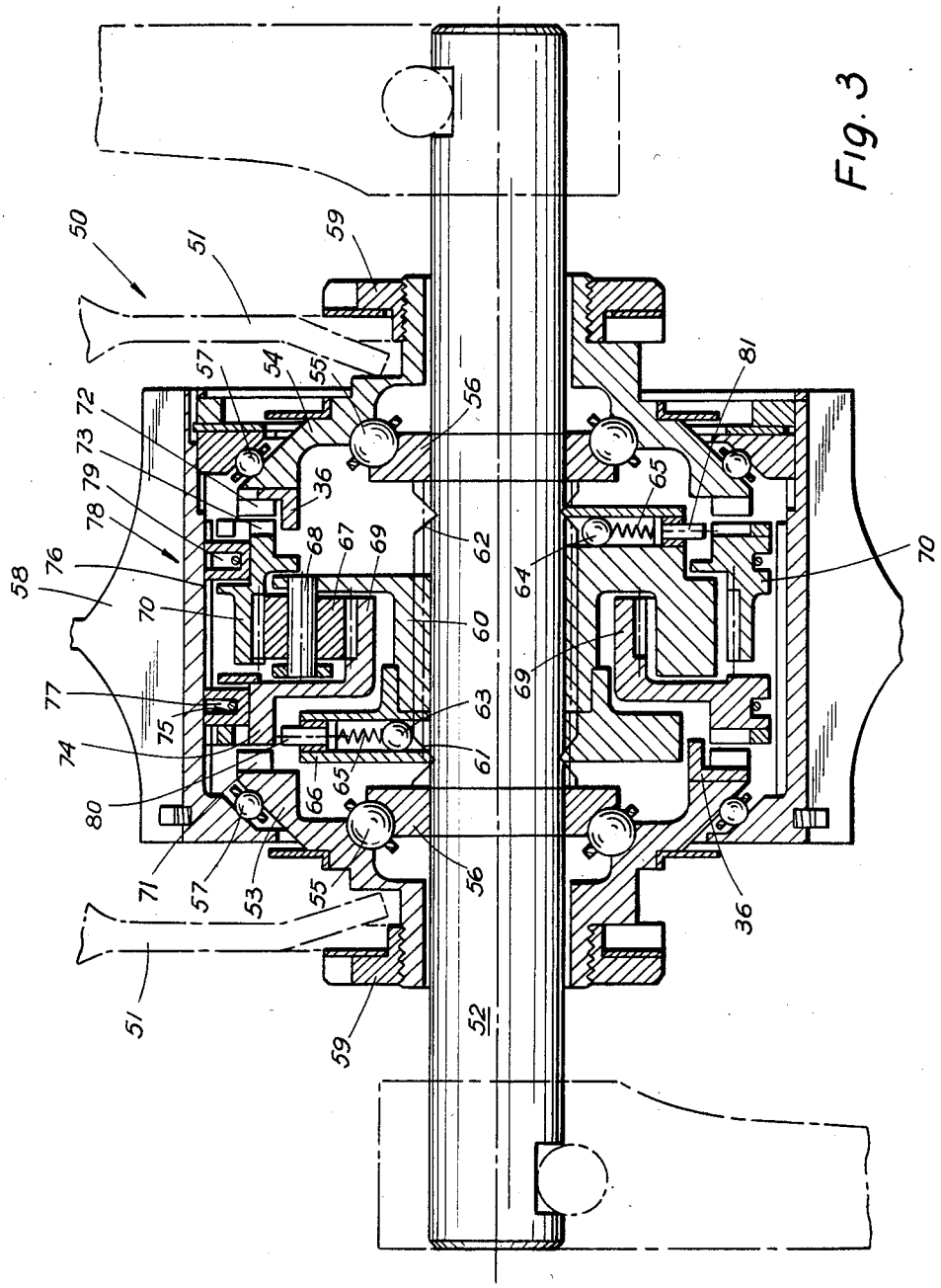
FIG. 3 is a schematic sectioned side elevation of a further planetary gear arrangement.

Turning now to FIG. 3 wherein a further planetary gear assembly 50 is depicted. The gear assembly 50 is attached to the front forks 51 of a front wheel pedal driven bicycle. However it should be appreciated that the planetary gear assembly 50 may be used in a conventional gear wheel driven bicycle or in any situation where a two speed planetary gear assembly may be used. As a further example, the planetary gear assembly 50 may be employed in a winch as conventionally used on sail craft for the raising and tensioning of sales.

The planetary gear assembly 50 is coupled to pedal driven shaft 52. The gear assembly 50 includes 2 bearing supports 53 and 54 which engage a first pair of bearings 55 which engage inarasis 56 mounted on the shaft 52. The bearings 55 secure the shaft 52 in position and allow rotation thereof upon a torque being applied via the pedals of the bicycle. The supports 53 and 54 also engage a pair of outer bearings 57 which rotatably support the central hub 58 of the wheel of the bicycle. The supports 53 and 54 are fixed to the front forks 51 by means of nuts 59 which threadably engage the supports 53 and 54.

The planetary gear assembly 50 includes a carrier 60 fixed to the shaft 52 by means of suppliance so as to rotate therewith about the longitudinal axis of the shaft 52. However, the carrier 60 is longitudinally movable of the shaft 52 to alter the reduction ratio of the planetary gear assembly 50. The planetary gear assembly 50 has two gear ratios, defined by the two operating positions of the carrier 50, which operating positions are defined by the annular notches 61 and 62 formed in the shaft 52. More particularly, the operating positions are defined by engagement in the grooves 61 and 62 of the balls 63 and 64 resiliently biased towards the shaft 52 by means of springs 65. The balls 63 and 64 and their associated springs 65 are located in passages 66 formed in the carrier 60. Mounted on the carrier 60 so as to be rotatable about axes spaced from the axis of the shaft 52, is a series of planetary gears 67. The planetary gears 67 rotate about pins 68 spaced radially from the shaft 52 but extending generally parallel thereto. The planetary gears 67 mesh and engage a sun gear 69 as well as a ring gear 70. The carrier 60, planetary gears 67, sun gear 69 and ring gear 70 are movable longitudinally of the shaft 52 as a complete assembly. The sun gear 69 and ring gear 70 are rotatably supported by the carrier 19. Integrally formed with the supports 53 and 54 are two sets of dogs 71 and 72 which selectively engage respectively with sets of dogs 73 and 74. The dogs 73 are integrally formed with the ring gear 70 while the dogs 74 are integrally formed with the sun gear 69. Accordingly, by selective engagement of the dogs 72 with the dogs 73, or the engagement of the dogs 74 with the dogs 71, either the sun gear 69 or ring gear 70 is held stationary and the other allowed to rotate. This selective meshing engagement of the dogs 72 and 73, and 71 and 74 is achieved by the longitudinal movement of the carrier 60 along the shaft 52. When the dogs 72 and 73 are engaged, rotation of the carrier 60 will cause rotation of the pantry gears 67 by massing engagement with the ring gear 70 which is now held stationary. This rotation of the planetary gears 67 is then transferred to the sun gear 69 wherefrom this rotational movement is transferred to the hub 58 by means of ratchet and pawl assemblies 75. The ratchet and pawl assemblies 75 include a polarity of ribs 76 engaged by pawls 77. When the carrier 60 is moved so that the dogs 74 and 71 are engaged, the sun gear 69 is prevented from movement and the ring gear 70 allowed to rotate about the shaft 52. Accordingly, the planetary gears 67 will then be caused to rotate by mashing engagement with the sun gear 69 upon rotation of the carrier 60. This rotation of the planetary gears 67 will cause rotation of the ring gear 70. This rotation of the ring gear 70 is transferred to the hub 58 by means of ratchet and pawl assemblies 78 which include pawls 79 as well as the ribs 76.

The ratchet and pawl assemblies 75 and 78 allow relative movement between them and the hub 78 when the hub 78 is moving relative to them in the driven direction. Accordingly, only one of the ratchet and pawl assemblies 75 or 78 is actually drivingly engaged with the ribs 30 at any one time.

The shaft 52 is pedal driven in a particular driving direction. Alteration of the ratio of the planetary gear assembly 50 is achieved by rotation of the shaft 52 in the opposite direction to the driving direction. Mounted on the carrier 60 are two ratchet members 80 and 81 biased radially outwardly to an operative position by means of the springs 65. Mounted on the support members 53 and 54 are stops. substantially identical to the stops 36 of FIG. 2. The ratchet members 80 and 81 engage ramp surfaces 37 or 39 depending on the direction of rotation of the shaft 52. If the shaft 52 is being rotated in a driving direction, then the ramp surfaces 39 are engaged to cause radial depression of the ratchets 80 and 81. If however, the shaft 52 is rotated in a non driving direction, then the ratchet members 80 and 81 engage the ramp surfaces 37 in order to thereby move the carriage 60 longitudinally of the shaft 52.

What I claim is:
1. A planetary gear arrangement comprising a shaft, a carrier mounted on the shaft so as to rotate therewith, said carrier being movable longitudinally of the shaft between a first and a second position, a plurality of planetary gears rotatably mounted on the carrier so as to be rotatable about axes generally parallel to said shaft but spaced radially therefrom, a sun gear meshingly engaged with said planetary gears to positions radially inwardly of the axis of said planetary gears relative to said shaft, a ring gear meshingly engaged with said planetary gears at positions radially outward of said axes of said planetary gears relative to said shaft, and wherein said sun gear and ring gear are rotatably supported on said carrier so as to be longitudinally movable with said carrier along said shaft, and said planetary gear arrangement further includes brake means to engage said sun gear when said carrier is in said first position to thereby hold said sun gear stationary so that said ring gear is free to rotate, and to engage said ring gear when said carrier is in said second position to thereby hold said ring gear stationary so that said sun gear is free to rotate.

2. The planetary gear arrangement of claim 1 further including a hub member selectively engaged by said ring gear or said sun gear so that rotary power is transferred between said hub member and said shaft.

3. The planetary gear arrangement of claim 2 further including ratchet means to selectively couple said sun gear or said ring gear to said hub member.

4. The planetary gear arrangement of claim 1 further including cam means to engage said carrier to cause movement thereof longitudinally of said shaft.

5. The planetary gear arrangement of claim 4 wherein said cam means includes a first cam member located so as to be engaged by said carrier when said carrier is in said first position, and a second cam member to engage said carrier when said carrier is in said second position.

6. The planetary gear arrangement of claim 5 further including first cam engaging means mounted on said carrier and positioned to selectively engage said first cam member when said carrier is in said first position, and second cam engaging means to engage said second cam member when said carrier is in said second position.

7. The planetary gear arrangement of claim 6 wherein each cam engaging means co-operates with its associated first or second cam member to move said carrier longitudinally of said shaft upon rotation of said shaft in a non-driving direction.

* * * * *